United States Patent
Liu

(10) Patent No.: US 11,520,188 B2
(45) Date of Patent: Dec. 6, 2022

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventor: Mingguo Liu, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/434,900

(22) PCT Filed: Dec. 25, 2020

(86) PCT No.: PCT/CN2020/139226
§ 371 (c)(1),
(2) Date: Aug. 30, 2021

(87) PCT Pub. No.: WO2022/126704
PCT Pub. Date: Jun. 23, 2022

(65) Prior Publication Data
US 2022/0187663 A1    Jun. 16, 2022

(30) Foreign Application Priority Data
Dec. 14, 2020  (CN) .......................... 202011470734.8

(51) Int. Cl.
*G02F 1/1343*  (2006.01)
*G02F 1/1362*  (2006.01)

(52) U.S. Cl.
CPC .. *G02F 1/134309* (2013.01); *G02F 1/134345* (2021.01); *G02F 1/136222* (2021.01)

(58) Field of Classification Search
None
See application file for complete search history.

(56) References Cited

U.S. PATENT DOCUMENTS

2020/0124931 A1* 4/2020 Yun .................. G02F 1/136286

FOREIGN PATENT DOCUMENTS

| CN | 102317850 A | 1/2012 |
| CN | 107272272 A | 10/2017 |

(Continued)

OTHER PUBLICATIONS

International Search Report in International application No. PCT/CN2020/139226, dated Sep. 15, 2021.

(Continued)

*Primary Examiner* — Richard H Kim
(74) *Attorney, Agent, or Firm* — PV IP PC; Wei Te Chung; Ude Lu

(57) ABSTRACT

The present application discloses a display panel and a display device. Each of pixel units of the display panel includes a plurality of sub-pixels, and each of the sub-pixels includes a first main electrode, a first branch electrode, a second main electrode, and a second branch electrode, wherein the first main electrode includes a first portion, and the second main electrode includes a first split body; wherein in each pixel unit, in at least one of the sub-pixels, the first acute angle formed by the first branch electrode and the first portion is greater than the second acute angle formed by the second branch electrode and the first split body.

20 Claims, 3 Drawing Sheets

(56) References Cited

FOREIGN PATENT DOCUMENTS

| | | | |
|---|---|---|---|
| CN | 107942589 | A | 4/2018 |
| CN | 110908195 | A | 3/2020 |
| CN | 111474789 | A | 7/2020 |
| CN | 111679516 | A | 9/2020 |
| CN | 112068362 | A | 12/2020 |
| KR | 100835112 | B1 | 6/2008 |

OTHER PUBLICATIONS

Written Opinion of the International Search Authority in international application No. PCT/CN2020/139226, dated Sep. 15, 2021.

* cited by examiner

DISPLAY PANEL AND DISPLAY DEVICE

RELATED APPLICATIONS

This application is a Notional Phase of PCT Patent Application No. PCT/CN2020/139226 having international filing date of Dec. 25, 2020, which claims the benefit of priority of Chinese Patent Application No. 202011470734.8 filed on Dec. 14, 2020. The contents of the above applications are all incorporated by reference as if fully set forth herein in their entirety.

BACKGROUND OF INVENTION

Field of Invention

The present application relates to the field of display technology, and in particular to a display panel and a display device.

Description of Prior Art

With improvement of living standards, liquid crystal display (LCD) panels are increasingly sought after by people. Among current 8-domain liquid crystal display panels, the liquid crystal display panels include a plurality of sub-pixels arranged in an array, and each sub-pixel includes a main pixel electrode and a sub-pixel electrode. In the industry, in order to increase transmittance, a ratio of an area of the main pixel electrode to an area of the sub-pixel electrode will be increased.

However, when the area of the sub-pixel remains unchanged, increasing the area of the main pixel electrode to increase the transmittance will result in a decrease in the area of the sub-pixel electrode, thereby resulting in poor viewing angle performance of the liquid crystal display panel.

In the current liquid crystal display panels, increasing the area of the main pixel electrode to increase the transmittance will result in a decrease in the area of the sub-pixel electrode, thereby resulting in poor viewing angle performance of the liquid crystal display panels.

SUMMARY OF INVENTION

In a first aspect, the present application provides a display panel, wherein the display panel includes an array substrate, a color filter substrate disposed opposite to the array substrate, a liquid crystal layer disposed between the color filter substrate and the array substrate, and a pixel structure disposed on a side of the array substrate close to the color filter substrate and including a plurality of pixel units, wherein each of the pixel units includes a plurality of sub-pixels, and each of the sub-pixels includes:

a main pixel electrode including a first main electrode and a first branch electrode connected to the first main electrode, wherein the first main electrode includes a first portion arranged along a first direction, the first branch electrode forms a first acute angle with the first portion; and a sub-pixel electrode including a second main electrode and a second branch electrode connected to the second main electrode, wherein the second main electrode includes a first split body arranged along the first direction, the second branch electrode forms a second acute angle with the first split body, wherein in each of the pixel units, the first acute angle is greater than the second acute angle in at least one of the sub-pixels.

In some embodiments, in each of the pixel units, the first acute angle is greater than the second acute angle by 5 to 15 degrees in at least one of the sub-pixels.

In some embodiments, in each of the pixel units, the first acute angle is greater than the second acute angle by 0 to 5 degrees in at least one of the sub-pixels.

In some embodiments, the first acute angle is 40 to 45 degrees.

In some embodiments, the second acute angle is 30 to 45 degrees.

In some embodiments, each of the pixel units includes a first sub-pixel, a second sub-pixel, and a third sub-pixel, and a color of the first sub-pixel, a color of the second sub-pixel, and a color of the third sub-pixel are different; and wherein the first acute angle of the first sub-pixel, the first acute angle of the second sub-pixel, and the first acute angle of the third sub-pixel are all 45 degrees, the second acute angle of the first sub-pixel and the second acute angle of the second sub-pixel are both 45 degrees or 40 degrees, and the second acute angle of the third sub-pixel is 40 degrees or 35 degrees.

In some embodiments, the pixel structure includes pixel areas in one-to-one correspondence to the pixel units, each of the pixel areas includes a plurality of sub-pixel areas, one of the sub-pixels is located in one of the sub-pixel areas; wherein each of the sub-pixel areas includes a main area and a sub-area, the main pixel electrode is located in the main area, and the sub-pixel electrode is located in the sub-area;

wherein the first main electrode further includes a second portion arranged along a second direction, and the second main electrode further includes a second split body arranged along a second direction; in each of the sub-pixels, the first main electrode divides the main area into four main domains, and the second main electrode divides the sub-area into four sub-domains; and wherein a plurality of first branch electrodes are distributed in each of the main domains, the plurality of first branch electrodes distributed in each of the main domains are arranged in parallel to each other at intervals, a plurality of second branch electrodes are distributed in each of the sub-domains, and the plurality of second branch electrodes distributed in each of the sub-domain are arranged in parallel to each other at intervals.

In some embodiments, in each of the sub-pixels, the first branch electrodes in adjacent ones of the main domains along the first direction are symmetrical with respect to the second portion, and the first branch electrodes in adjacent ones of the main domains along the second direction are symmetrical with respect to the first portion; and wherein, in each of the sub-pixels, the second branch electrodes in adjacent ones of the sub-domains along the first direction are symmetrical with respect to the second split body, and the second branch electrodes in adjacent ones of the sub-domains along the second direction are symmetrical with respect to the first split body.

In some embodiments, in each of the pixel units, first acute angles in at least two of the main domains of at least one of the sub-pixels are different.

In some embodiments, in each pixel unit, second acute angles in at least two of the sub-domains of at least one of the sub-pixels are different.

In some embodiments, the display panel further includes a first polarizer and a second polarizer, the first polarizer is located on a side of the array substrate away from the color filter substrate, the second polarizer is located on a side of the color filter substrate away from the array substrate; a direction of an optical axis of the first polarizer is parallel to the first direction, and a direction of the optical axis of the second polarizer is parallel to the second direction.

In some embodiments, a common electrode is disposed on a side of the color filter substrate close to the array substrate, and the common electrode is disposed opposite to the pixel structure; and wherein, in each of the sub-pixels, a difference in voltage between the main pixel electrode and the common electrode is different from a difference in voltage between the sub-pixel electrode and the common electrode.

In some embodiments, in each of the sub-pixels, an area of an orthographic projection of the main pixel electrode on the array substrate is greater than or equal to one half of an area of an orthographic projection of the sub-pixel electrode on the array substrate.

In a second aspect, the present application also provides a display device, wherein the display device includes a display panel, the display panel includes an array substrate, a color filter substrate disposed opposite to the array substrate, a liquid crystal layer disposed between the color filter substrate and the array substrate, and a pixel structure disposed on a side of the array substrate close to the color filter substrate and including a plurality of pixel units, wherein each of the pixel units includes a plurality of sub-pixels, and each of the sub-pixels includes:

a main pixel electrode including a first main electrode and a first branch electrode connected to the first main electrode, wherein the first main electrode includes a first portion arranged along a first direction, the first branch electrode forms a first acute angle with the first portion; and a sub-pixel electrode including a second main electrode and a second branch electrode connected to the second main electrode, wherein the second main electrode includes a first split body arranged along the first direction, the second branch electrode forms a second acute angle with the first split body, wherein in each of the pixel units, the first acute angle is greater than the second acute angle in at least one of the sub-pixels.

In some embodiments, in each of the pixel units, the first acute angle is greater than the second acute angle by 5 to 15 degrees in at least one of the sub-pixels.

In some embodiments, in each of the pixel units, the first acute angle is greater than the second acute angle by 0 to 5 degrees in at least one of the sub-pixels.

In some embodiments, the first acute angle is 40 to 45 degrees.

In some embodiments, the second acute angle is 30 to 45 degrees.

In some embodiments, each of the pixel units includes a first sub-pixel, a second sub-pixel, and a third sub-pixel, and a color of the first sub-pixel, a color of the second sub-pixel, and a color of the third sub-pixel are different; and wherein the first acute angle of the first sub-pixel, the first acute angle of the second sub-pixel, and the first acute angle of the third sub-pixel are all 45 degrees, the second acute angle of the first sub-pixel and the second acute angle of the second sub-pixel are both 45 degrees or 40 degrees, and the second acute angle of the third sub-pixel is 40 degrees or 35 degrees.

In some embodiments, the pixel structure includes pixel areas in one-to-one correspondence to the pixel units, each of the pixel areas includes a plurality of sub-pixel areas, one of the sub-pixels is located in one of the sub-pixel areas; wherein each of the sub-pixel areas includes a main area and a sub-area, the main pixel electrode is located in the main area, and the sub-pixel electrode is located in the sub-area;

wherein the first main electrode further includes a second portion arranged along a second direction, and the second main electrode further includes a second split body arranged along a second direction; in each of the sub-pixels, the first main electrode divides the main area into four main domains, and the second main electrode divides the sub-area into four sub-domains; and wherein a plurality of first branch electrodes are distributed in each of the main domains, the plurality of first branch electrodes distributed in each of the main domains are arranged in parallel to each other at intervals, a plurality of second branch electrodes are distributed in each of the sub-domains, and the plurality of second branch electrodes distributed in each of the sub-domain are arranged in parallel to each other at intervals.

By increasing an area of an upper surface of a main pixel electrode under a premise that an area of a sub-pixel remains unchanged, transmittance of the liquid crystal display panel is greatly improved. Meanwhile, by adjusting a first acute angle and a second acute angle, in each of pixel units, there is at least one sub-pixel in which the first acute angle is larger than the second acute angle, so that deflection angles of the liquid crystal located in the main area of the sub-pixel and the liquid crystal located in the sub-area of the sub-pixel are different, thus reducing a difference in displayed image between different viewing angles to eliminate a viewing angle loss caused by increasing the area of the upper surface of the main pixel electrode, such that the liquid crystal display panel can have better transmittance and viewing angle performance at the same time.

BRIEF DESCRIPTION OF DRAWINGS

The technical solutions and other beneficial effects of the present application will be made obvious by describing the specific implementation manners of the present application in detail below in conjunction with the accompanying drawings.

Figure 1:
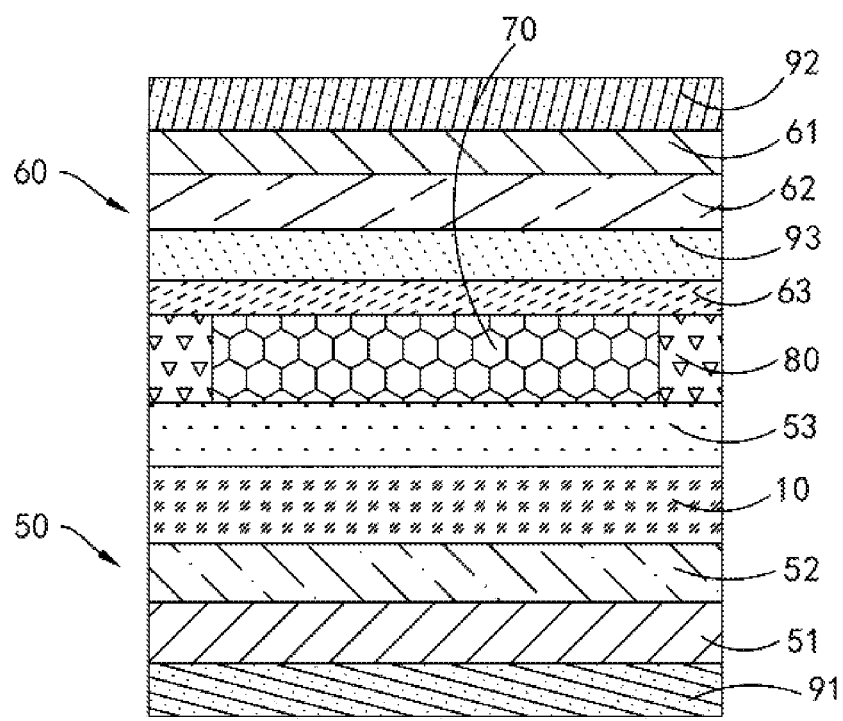
FIG. 1 is a schematic structural diagram of a display panel in an embodiment of the present application.

Elements in the drawings are designated by reference numerals listed below.

10, pixel structure; 20, pixel unit; 30, sub-pixel; 31, main pixel electrode; 311, first main electrode; 311a, first portion; 311b, second portion; 312, first branch electrode; 32, sub-pixel electrode; 321, second main electrode; 321a, first portion; 321b, second portion; 322, second branch electrode; 40, pixel area; 41, sub-pixel area; 411, main area; 412, sub-area 50, array substrate; 51, first base substrate; 52, array layer; 53, first alignment layer; 60, color filter substrate; 61, second base substrate; 62, color filter layer; 63, second alignment layers; 70, liquid crystal layer; 80, frame sealant layer; 91, first polarizer; 92, second polarizer; 93, common electrode.

DETAILED DESCRIPTION OF PREFERRED EMBODIMENTS

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the drawings, structurally similar elements are denoted by the same reference numerals.

The present invention addresses the technical problem that in the existing liquid crystal display panel, increasing the area of the main pixel electrode to increase the transmittance will result in a decrease in the area of the sub-pixel electrode, thereby leading to poor viewing angle performance of the liquid crystal display panel.

Figure 2:
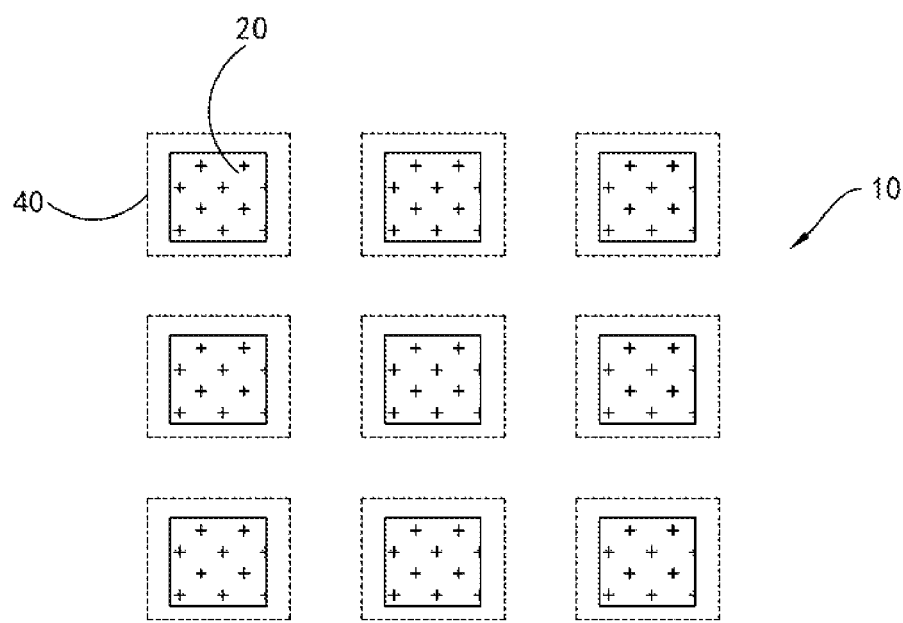
FIG. 2 is a schematic structural diagram of a pixel structure in an embodiment of the present application.
Figure 3:
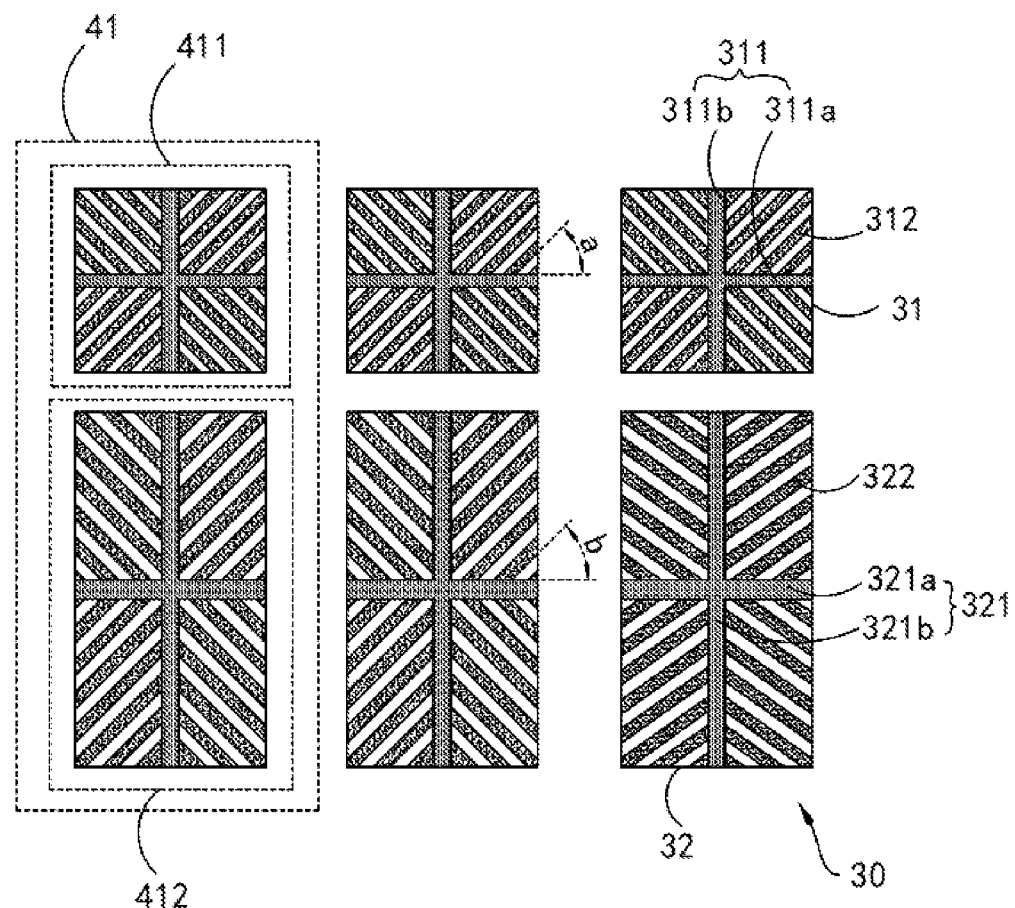
FIG. 3 is a schematic structural diagram of a pixel unit in an embodiment of the present application.

A display panel, as shown in FIGS. 1 to 3, a liquid crystal display panel includes an array substrate 50, a color filter substrate 60 disposed opposite to the array substrate 50, and a liquid crystal layer 70 and a frame sealant layer 80 disposed between the color filter substrate 60 and the array substrate 50. The color filter substrate 60, the array substrate 50, and the frame sealant layer 80 are enclosed to form an accommodating space, and the liquid crystal layer 70 is disposed in the accommodating space.

Specifically, a pixel structure 10 is provided on the side of the array substrate 50 close to the color filter substrate 60, and the pixel structure 10 includes a plurality of pixel areas 40 distributed in an array and a plurality of pixel units 20 in one-to-one correspondence to the pixel areas 40. One pixel unit 20 is located in one pixel area 40.

Specifically, each pixel unit 20 includes a plurality of sub-pixels 30, and the plurality of sub-pixels 30 in each pixel unit 20 are arranged at intervals and may be arranged in a horizontal direction; each pixel area 40 includes a plurality of sub-pixel areas 41, a number of sub-pixel areas 41 of one pixel area 40 is the same as a number of sub-pixels 30 in the corresponding one of the pixel unit 20, and one sub-pixel 30 is located in one sub-pixel area 41, that is, the sub-pixel areas 41 correspond to the sub-pixels 30 in one-to-one correspondence.

Each of the sub-pixels 30 includes a main pixel electrode 31 and a sub-pixel electrode 32, and the main pixel electrode 31 and the sub-pixel electrode 32 of each sub-pixel 30 are spaced apart and can be arranged in a vertical direction. Each of the sub-pixel areas 41 includes a main area 411 and a sub-area 412, the main pixel electrode 31 is located in the main area 411, and the sub-pixel electrode 32 is located in the sub-area 412.

Specifically, the main pixel electrode 31 includes a first main electrode 311 and a first branch electrode 312 connected to the first main electrode 311, the first main electrode 311 includes a first portion 311a disposed along a first direction and a second portion 311b disposed along a second direction, and the first branch electrode 312 and the first portion 311a form a first acute angle a.

It is appreciated that the first branch electrode 312 and the first portion 311a may form two different but complementary angles. When the first branch electrode 312 is not perpendicular to the first portion 311a, in the two included angles formed by the first branch electrode 312 and the first portion 311a, one included angle is an acute angle, and the other included angle is an obtuse angle. The acute angle of the two included angles formed by the first branch electrode 312 and the first portion 311a is the first acute angle a of the present application.

Specifically, the sub-pixel electrode 32 includes a second main electrode 321 and a second branch electrode 322 connected to the second main electrode 321, and the second main electrode 321 includes a first split body 321a arranged along a first direction and a second split body 321b arranged along the second direction. The second branch electrode 322 and the first split body 321a form a second acute angle b. In each of the pixel units 20, the first acute angle a of at least one of the sub-pixels 30 is greater than the second acute angle b.

It is appreciated that the acute angle of the two included angles formed by the second branch electrode 322 and the first split body 321a is the second acute angle b of the present application, the first acute angle a of the sub-pixel 30 refers to the first acute angle a formed by the first branch electrode 312 and the first portion 311a of the sub-pixel 30, and the second acute angle b of the sub-pixel 30 refers to the second acute angle b formed by second branch electrode 322 and the first split body 321a of the sub-pixel 30. In each of the pixel units 20, the first acute angle a of at least one of the sub-pixels 30 is greater than the second acute angle b.

It should be noted that in the liquid crystal display panel, transmittance complies with the formula:

$$Tr = \frac{1}{2}[\sin^2(2\varphi)]\left[\sin^2\left(\frac{\pi(\Delta n)d}{\lambda}\right)\right];$$

wherein Tr is the transmittance, d is a thickness of a liquid crystal cell of the liquid crystal display panel, and $\varphi$ is the first acute angle a or the second acute angle b.

It is appreciated that from the above formula, the transmittance is related to the first acute angle a and the second acute angle b, and due to anisotropy of the liquid crystal, there is a difference between light paths through the liquid crystal when viewed from a front and a side, and this difference will cause a difference of brightness and darkness in the displayed image at different viewing angles. The larger the difference is, the worse the viewing angle performance is.

In the present application, by adjusting the first acute angle a and the second acute angle b, in each pixel unit 20, there is at least one sub-pixel 30 in which a first acute angle a is larger than a second acute angle b, such that deflection angles of the liquid crystal in the main area 411 of the sub-pixel 30 and the liquid crystal in the sub-area 412 of the sub-pixel 30 are different, thus reducing the difference in displayed image at different viewing angles, so as to improve and enhance the viewing angle performance of the liquid crystal display panel.

In one embodiment, the first acute angle a of at least one of the sub-pixels 30 is greater than the second acute angle b by 5 to 15 degrees.

It is appreciated that, in each pixel unit 20, there is at least one sub-pixel 30 in which the first acute angle a is greater than the second acute angle b by 5 to 15 degrees, and in the sub-pixel 30, the first acute angle a may be larger than the second acute angle a by 5 degrees, 8 degrees, 10 degrees, 15 degrees, etc., and not every one of them is listed here.

It should be noted that by setting a size relationship between the first acute angle a and the second acute angle b of the sub-pixel 30, to make the first acute angle a and the second acute angle b of the sub-pixel 30 have a proper difference in degrees, the viewing angle performance of the liquid crystal display panel can be ensured without impacting an alignment yield of the later process.

In one embodiment, in each of the pixel units 20, the first acute angle a of at least one of the sub-pixels 30 is greater than the second acute angle b by 0-5 degrees.

It is appreciated that, in each pixel unit 20, there is at least one sub-pixel 30 where the first acute angle a is greater than the second acute angle b by 0-5 degrees, and the first acute angle a of the sub-pixel 30 may be greater than the second acute angle a by 0 degree, 1 degree, 2 degrees, 3 degrees, 4 degrees, or 5 degrees, etc., and not every one of them is listed here.

It should be noted that by setting the size relationship between the first acute angle a and the second acute angle b of the sub-pixel 30, each pixel unit 20 not only has a sub-pixel 30 in which a larger difference is present between the first acute angle a and the second acute angle b, but also has a sub-pixel 30 in which a small difference is present between the first acute angle a and the second acute angle b, so as to ensure the viewing angle performance of the liquid crystal display panel while ensuring the transmittance of the pixel unit 20.

Specifically, the first acute angle a is 40 to 45 degrees, and the first acute angle a may be 40 degrees, 42 degrees, 43 degrees, or 45 degrees, etc., and not every one of them is listed here.

Specifically, the second acute angle b is 30 to 45 degrees, and the second acute angle b may be 30 degrees, 35 degrees, 40 degrees, or 45 degrees, etc., and not every one of them is listed here.

It should be noted that when the area occupied by the main pixel electrode 31 and the area occupied by the sub-pixel electrode 32 are constant, and the first acute angles a and the second acute angles b of all the sub-pixels 30 in the pixel unit 20 are all 45 degrees, the pixel unit 20 has the largest aperture ratio and transmittance, and by designing the angles of the first acute angle a and the second acute angle b, requirements of the viewing angle performance of the liquid crystal display panel can be met while ensuring the transmittance of pixel units 20.

In one embodiment, each of the pixel units 20 includes a first sub-pixel, a second sub-pixel, and a third sub-pixel, and the color of the first sub-pixel, the color of the second sub-pixel, and the color of the third sub-pixels are all different.

The first acute angle a of the first sub-pixel, the first acute angle a of the second sub-pixel, and the first acute angle a of the third sub-pixel are all 45 degrees. The second acute angle b of the first sub-pixel and the second acute angle b of the second sub-pixel are both 45 degrees or 40 degrees, and the second acute angle b of the third sub-pixel is 40 degrees or 35 degrees.

It is appreciated that the first acute angle a of all sub-pixels 30 is set to 45 degrees to ensure the pixel aperture ratio, and meanwhile in each of the pixel units 20, there is a sub-pixel 30 in which the first acute angle a is greater than the second acute angle b to meet requirements of the viewing angle performance of the liquid crystal display panel. Of course, the first acute angle a and the second acute angle b of the first sub-pixel, the second sub-pixel, and the third sub-pixel may also be other angles, and not every one of them is listed here.

Specifically, on the premise that the color of the first sub-pixel, the color of the second sub-pixel, and the color of the third sub-pixel are all different, the first sub-pixel may be one of a red sub-pixel, a green sub-pixel, and a blue sub-pixel, the second sub-pixel may be another one of a red sub-pixel, a green sub-pixel, and a blue sub-pixel that is different from the first sub-pixel, and the third sub-pixel may be yet another one of a red sub-pixel, a green sub-pixel, and a blue sub-pixel that is different from the first sub-pixel and the second sub-pixel.

In one embodiment, the first sub-pixel is a red sub-pixel, the second sub-pixel is a green sub-pixel, and the third sub-pixel is a blue sub-pixel.

It is appreciated that the light transmittance of the sub-pixels 30 of different colors is different, which results in a difference in brightness at different viewing angles when the sub-pixels 30 of different colors use the same pixel electrode. The second acute angles b of the sub-pixels 30 of different colors are designed to be different to further improve the viewing angle performance of the liquid crystal display panel.

As shown in Table 1, taking one pixel unit 20 including three sub-pixels 30 as an example, the first sub-pixel is a red sub-pixel, the second sub-pixel is a green sub-pixel, and the third sub-pixel is a blue sub-pixel. Table 1 shows a percentage increase in the viewing angle of the liquid crystal display panel when an area of an upper surface of the main pixel electrode 31 and an area of an upper surface of the sub-pixel electrode 32 are constant, the first acute angles a of all sub-pixels 30 in the pixel unit 20 are 45 degrees, and different numbers of sub-pixels 30 have the different second acute angles b.

TABLE 1

| No. | second acute angle b | | | percentage increase (%) |
| --- | --- | --- | --- | --- |
| | first sub-pixel | second sub-pixel | third sub-pixel | |
| 1 | 45 | 45 | 45 | 0% |
| 2 | 40 | 40 | 40 | 10% |
| 3 | 35 | 35 | 35 | 16% |
| 4 | 40 | 40 | 35 | 20% |
| 5 | 45 | 45 | 40 | 16% |
| 6 | 45 | 45 | 35 | 24% |

It should be noted that the first set of data in Table 1 is used as a control group, that is, the data where the second acute angle b of the first sub-pixel, the second sub-pixel and the third sub-pixel are all 45 degrees is the control group. As can be seen from Table 1, when the first acute angle a is greater than the second acute angle b in at least one of the sub-pixels 30 in each pixel unit 20, the viewing angle of the liquid crystal display panel is significantly improved.

It should be noted that each pixel unit 20 may also include a greater number of sub-pixels 30, such as 4 sub-pixels 30 or 5 sub-pixels 30, etc.; each pixel unit 20 may also include sub-pixels 30 of fewer or more colors. For example, each pixel unit 20 may only include a red sub-pixel and a blue sub-pixel, and each pixel unit 20 may further include a white sub-pixel.

Specifically, the first direction may be a horizontal direction, and the second direction may be a vertical direction. The first portion 311a and the second portion 311b intersect each other to form a first main electrode 311 of a cross shape, and in each sub-pixel 30, the first main electrode 311 divides the main area 411 into four main domains.

A plurality of the first branch electrodes 312 are distributed in each of the main domains, and the plurality of first branch electrodes 312 in each of the main domains are arranged at intervals in parallel, that is, in each of the sub-pixels 30, the first acute angle a formed by the plurality of first branch electrode 312 and the first portion 311a in each of the main domains is the same to improve the alignment yield in the later process.

In one embodiment, in each of the sub-pixels 30, the first branch electrodes 312 in adjacent ones of the main domains along the first direction are symmetrical with respect to the second portion 311b, and the first branch electrodes 312 in adjacent ones of the main domains along the second direction are symmetrical with respect to the first portion 311a, that is, in each of the sub-pixels 30, in all the main domains, the first acute angle a formed by the first branch electrodes 312 and the first portions 311a is the same.

In another embodiment, in each of the pixel units 20, the first acute angles a of at least two of the main domains of at least one of the sub-pixels 30 are different.

It is appreciated that the first acute angles of at least two of the main domains of at least one of the sub-pixels 30 are different, which means that each of the pixel units 20 has at least one sub-pixel 30, in which in the four main domains, the first acute angles a formed by the first branch electrodes 312 and the first portions 311a in at least two of the main domains are different. For example, in one of the main domains, the first acute angle a formed by the first branch electrode 312 and the first portion 311a is 45 degrees, and in another one of the main domains, the first acute angle a formed by the first branch electrode 312 and the first portion 311a is 40 degrees, so that rotation angles of the liquid crystals in different main domains are different to further reduce a difference in brightness at different viewing angles and improve the viewing angle performance.

Specifically, the first split body 321a intersects the second split body 321b to form a second main electrode 321 of a cross shape. In each of the sub-pixels 30, the second main electrode 321 divides the sub-area 412 into four sub-domains.

A plurality of second branch electrodes 322 are distributed in each sub-domain, and the plurality of second branch electrodes 322 in each sub-domain are arranged at intervals in parallel, that is, in each of the sub-pixels 30, in each of the sub-domains, the second acute angles b formed by the plurality of second branch electrodes 322 and the first split body 321a are the same, so as to improve the alignment yield of the later process.

In one embodiment, in each of the sub-pixels 30, the second branch electrodes 322 in adjacent ones of the sub-domains along the first direction are symmetrical with respect to the second split body 321b, and the second branch electrodes 322 in adjacent ones of the sub-domains along the second direction are symmetrical with respect to the first split body 321a, that is, in each of the sub-pixels 30, in all the sub-domains, the second acute angles b formed by the second branch electrodes 322 and the first split body 321a are the same.

In another embodiment, in each of the pixel units 20, the second acute angles b of at least two of the sub-domains of at least one of the sub-pixels 30 are different.

It is appreciated that the second acute angle b of at least two sub-domains of at least one of the sub-pixels 30 are different, which means that each of the pixel units 20 has at least one sub-pixel 30, in which in the four sub-domains of the sub-pixel 30, the second acute angle b formed by the second branch electrodes 322 and the second portions 321a in at least two of the sub-domains are different. For example, in one of the sub-domains, the second acute angle b formed by the second branch electrodes 322 and the second portions 321a is 40 degrees, and in another one of the sub-domains, the second acute angle b formed by the second branch electrodes 322 and the second portions 321a is 35 degrees, so that rotation angles of the liquid crystals in different main domains are different to further reduce a difference in brightness at different viewing angles and improve the viewing angle performance.

In one embodiment, in each of the sub-pixels 30, an area of an orthographic projection of the main pixel electrode 31 on the array substrate 50 is greater than or equal to one-half of an area of an orthographic projection of the sub-pixel electrode 32 on the array substrate 50.

It should be noted that the main pixel electrode 31 is located in the main area 411, and the sub-pixel electrode 32 is located in the sub-area 412. The area of the orthographic projection of the main pixel electrode 31 on the array substrate 50 refers to the area of the upper surface of the main pixel electrode 31, and the area of the orthographic projection of the sub-pixel electrode 32 on the array substrate 50 refers to the area of the upper surface of the sub-pixel electrode 32.

It is appreciated that by increasing the area of the upper surface of the main pixel electrode 31, a pixel aperture ratio can be increased, thereby increasing the transmittance of the pixel electrode, and a viewing angle loss caused by the increase in the area of the upper surface of the main pixel electrode 31 can be alleviated by designing the first acute angle a and the second acute angle b, so that the transmittance and visual performance of the display panel can be improved at the same time.

Specifically, in each of the sub-pixels 30, the area of the orthographic projection of the main pixel electrode 31 on the array substrate 50 may also be equal to two-thirds, three-quarters, or double of the area of the orthographic projection of the sub-pixel electrode 32 on the array substrate 50.

As shown in Table 2, taking one pixel unit 20 including three sub-pixels 30 as an example, the first sub-pixel is a red sub-pixel, the second sub-pixel is a green sub-pixel, and the third sub-pixel is a blue sub-pixel. Table 2 shows the transmittance and a percentage increase in the viewing angle of the liquid crystal display panel when the first acute angles a of all the sub-pixels 30 in the pixel unit 20 are 45 degrees, and different numbers of the sub-pixels 30 have different second acute angles b.

TABLE 2

| | second acute angle b | | | | percentage |
|---|---|---|---|---|---|
| No. | first sub-pixel | second sub-pixel | third sub-pixel | transmittance (%) | increase (%) |
| 1 | 45 | 45 | 45 | 100% | 0% |
| 2 | 40 | 40 | 40 | 117.09% | 10% |
| 3 | 35 | 35 | 35 | 109.32% | 16% |
| 4 | 40 | 40 | 35 | 116.12% | 20% |
| 5 | 45 | 45 | 40 | 119.03% | 16% |
| 6 | 45 | 45 | 35 | 119.03% | 24% |

It should be noted that the first set of data in Table 1 is used as a control group, that is, the data where the area of the upper surface of the pixel electrode is half of the area of the upper surface of the sub-pixel electrode 32, and the second acute angle b of the first sub-pixel, the second sub-pixel and the third sub-pixel are all 45 degrees is the control group. As can be seen from Table 1, when the area of the upper surface of the main pixel electrode 31 and the angle of the second acute angle b are adjusted at the same time, the transmittance and visual performance are greatly improved at the same time.

In one embodiment, a voltage of the main pixel electrode 31 is different from a voltage of the sub-pixel electrode 32, so that a deflection angle of the liquid crystal in the main area 411 and a deflection angle of the liquid crystal in the sub-area 412 are different due to different voltages, thereby reducing the difference in displayed image at different viewing angles, thus further improving and enhancing the viewing angle performance of the liquid crystal display panel.

It should be noted that the voltage of the main pixel electrode 31 and the voltage of the sub-pixel electrode 32 can be selected according to actual conditions.

Specifically, the display panel further includes a first polarizer 91 and a second polarizer 92. The first polarizer 91 is located on a side of the array substrate 50 away from the color filter substrate 60. The second polarizer 92 is located on a side of the color filter substrate 60 away from the array substrate 50. A direction of an optical axis of the first polarizer 91 is parallel to the first direction, and a direction of an optical axis of the second polarizer 92 is parallel to the second direction.

It is appreciated that the direction of the optical axis of the first polarizer 91 is parallel to the first direction, that is, both the first portion 311*a* of the first main electrode 311 and the first split body 321*a* of the second main electrode 321 are parallel to the direction of the optical axis of the first polarizer 91; and the direction of the optical axis of the second polarizer 92 is parallel to the second direction, that is, both the second portion 311*b* of the first main electrode 311 and the second split body 321*b* of the second main electrodes 321 are parallel to the direction of the optical axis of the second polarizer 92.

In one embodiment, a common electrode 93 is provided on a side of the color filter substrate 60 close to the array substrate 50, and the common electrode 93 is disposed opposite to the pixel structure 10. A voltage difference between the main pixel electrode 31 and the common electrode 93 and a voltage difference between the sub-pixel electrode 32 and the common electrode 93 are used to drive the liquid crystal in the liquid crystal layer 70 to deflect.

In one embodiment, in each of the sub-pixels 30, the voltage difference between the main pixel electrode 31 and the common electrode 93 and the voltage difference between the sub-pixel electrode 32 and the common electrode 93 are different, so that the rotation angle of the liquid crystal located in the main area 411 and the rotation angle of the liquid crystal located in the sub-area 412 are different, thereby further reducing the difference in brightness at different viewing angles and improving the viewing angle performance.

In an embodiment, the common electrode 93 may include a first electrode corresponding to the main pixel electrode 31 and a second electrode corresponding to the sub-pixel electrode 32, and the voltages of the first electrode and the second electrode may be the same constant voltage, and in this case, the voltages of the main pixel electrode 31 and the common electrode 93 are different.

The voltages of the first electrode and the second electrode may also be different constant voltages, and in this case, the voltages of the main pixel electrode 31 and the common electrode 93 may be the same or different.

In one embodiment, the array substrate 50 includes a first base substrate 51 and an array layer 52 disposed on the first base substrate 51, and the pixel structure 10 is disposed on the array layer 52, and the array layer 52 includes devices such as a thin film transistor connected to the pixel structure 10.

In one embodiment, the array substrate 50 further includes a first alignment layer 53 covering the pixel structure 10.

In one embodiment, the color filter substrate 60 may further include a color filter layer 62 disposed on a side of the second base substrate 61 close to the array substrate 50, and the common electrode 93 is disposed on a side of the color filter layer 62 close to the array substrate 50.

In one embodiment, the color filter substrate 60 may further include a second alignment layer 63 covering the common electrode 93.

Based on the above-mentioned display panel, the present application also provides a display device, which includes the display panel as described in any of the above-mentioned embodiments. The display device may also include a driver IC for driving the display panel and modules such as a power module for supplying power to the display panel.

Beneficial effects of the present invention are that: by increasing an area of an upper surface of a main pixel electrode under a premise that an area of a sub-pixel remains unchanged, transmittance of the liquid crystal display panel is greatly improved. Meanwhile, by adjusting a first acute angle and a second acute angle, in each of pixel units, there is at least one sub-pixel in which the first acute angle is larger than the second acute angle, so that deflection angles of the liquid crystal located in the main area of the sub-pixel and the liquid crystal located in the sub-area of the sub-pixel are different, thus reducing a difference in displayed image between different viewing angles to eliminate a viewing angle loss caused by increasing the area of the upper surface of the main pixel electrode, such that the liquid crystal display panel can have better transmittance and viewing angle performance at the same time.

In the above embodiments, the descriptions of each embodiment have their own emphasis. The parts that are not described in detail in an embodiment can be referred to the detailed descriptions in other embodiments above, which will not be repeated herein for brevity.

Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A display panel, wherein the display panel comprises an array substrate, a color filter substrate disposed opposite to the array substrate, a liquid crystal layer disposed between the color filter substrate and the array substrate, and a pixel structure disposed on a side of the array substrate close to the color filter substrate and comprising a plurality of pixel units, wherein each of the pixel units comprises a plurality of sub-pixels, and each of the sub-pixels comprises:
   a main pixel electrode comprising a first main electrode and a first branch electrode connected to the first main electrode, wherein the first main electrode comprises a first portion arranged along a first direction, the first branch electrode forms a first acute angle with the first portion; and
   a sub-pixel electrode comprising a second main electrode and a second branch electrode connected to the second main electrode, wherein the second main electrode comprises a first split body arranged along the first direction, the second branch electrode forms a second acute angle with the first split body,
   wherein in each of the pixel units, the first acute angle is greater than the second acute angle in at least one of the sub-pixels; and wherein the second acute angles of the sub-pixels are different for different colors of the sub-pixels.

2. The display panel according to claim 1, wherein in each of the pixel units, the first acute angle is greater than the second acute angle by 5 to 15 degrees in at least one of the sub-pixels.

3. The display panel according to claim 1, wherein, in each of the pixel units, the first acute angle is greater than the second acute angle by 0 to 5 degrees in at least one of the sub-pixels.

4. The display panel according to claim 1, wherein the first acute angle is 40 to 45 degrees.

5. The display panel according to claim 1, wherein the second acute angle is 30 to 45 degrees.

6. The display panel according to claim 1, wherein each of the pixel units comprises a first sub-pixel, a second sub-pixel, and a third sub-pixel, and a color of the first sub-pixel, a color of the second sub-pixel, and a color of the third sub-pixel are different; and
wherein the first acute angle of the first sub-pixel, the first acute angle of the second sub-pixel, and the first acute angle of the third sub-pixel are all 45 degrees, the second acute angle of the first sub-pixel and the second acute angle of the second sub-pixel are both 45 degrees or 40 degrees, and the second acute angle of the third sub-pixel is 40 degrees or 35 degrees.

7. The display panel according to claim 1, wherein the pixel structure comprises pixel areas in one-to-one correspondence to the pixel units, each of the pixel areas comprises a plurality of sub-pixel areas, one of the sub-pixels is located in one of the sub-pixel areas;
wherein each of the sub-pixel areas comprises a main area and a sub-area, the main pixel electrode is located in the main area, and the sub-pixel electrode is located in the sub-area;
wherein the first main electrode further comprises a second portion arranged along a second direction, and the second main electrode further comprises a second split body arranged along a second direction; in each of the sub-pixels, the first main electrode divides the main area into four main domains, and the second main electrode divides the sub-area into four sub-domains; and
wherein a plurality of first branch electrodes are distributed in each of the main domains, the plurality of first branch electrodes distributed in each of the main domains are arranged in parallel to each other at intervals, a plurality of second branch electrodes are distributed in each of the sub-domains, and the plurality of second branch electrodes distributed in each of the sub-domain are arranged in parallel to each other at intervals.

8. The display panel according to claim 7, wherein in each of the sub-pixels, the first branch electrodes in adjacent ones of the main domains along the first direction are symmetrical with respect to the second portion, and the first branch electrodes in adjacent ones of the main domains along the second direction are symmetrical with respect to the first portion; and
wherein, in each of the sub-pixels, the second branch electrodes in adjacent ones of the sub-domains along the first direction are symmetrical with respect to the second split body, and the second branch electrodes in adjacent ones of the sub-domains along the second direction are symmetrical with respect to the first split body.

9. The display panel according to claim 7, wherein, in each of the pixel units, first acute angles in at least two of the main domains of at least one of the sub-pixels are different.

10. The display panel according to claim 7, wherein, in each pixel unit, second acute angles in at least two of the sub-domains of at least one of the sub-pixels are different.

11. The display panel according to claim 1, wherein the display panel further comprises a first polarizer and a second polarizer, the first polarizer is located on a side of the array substrate away from the color filter substrate, the second polarizer is located on a side of the color filter substrate away from the array substrate; a direction of an optical axis of the first polarizer is parallel to the first direction, and a direction of the optical axis of the second polarizer is parallel to the second direction.

12. The display panel according to claim 11, wherein a common electrode is disposed on a side of the color filter substrate close to the array substrate, and the common electrode is disposed opposite to the pixel structure; and
wherein, in each of the sub-pixels, a voltage difference between the main pixel electrode and the common electrode is different from a voltage difference between the sub-pixel electrode and the common electrode.

13. The display panel according to claim 1, wherein, in each of the sub-pixels, an area of an orthographic projection of the main pixel electrode on the array substrate is greater than or equal to one half of an area of an orthographic projection of the sub-pixel electrode on the array substrate.

14. A display device, wherein the display device comprises a display panel, the display panel comprises an array substrate, a color filter substrate disposed opposite to the array substrate, a liquid crystal layer disposed between the color filter substrate and the array substrate, and a pixel structure disposed on a side of the array substrate close to the color filter substrate and comprising a plurality of pixel units, wherein each of the pixel units comprises a plurality of sub-pixels, and each of the sub-pixels comprises:
a main pixel electrode comprising a first main electrode and a first branch electrode connected to the first main electrode, wherein the first main electrode comprises a first portion arranged along a first direction, the first branch electrode forms a first acute angle with the first portion; and
a sub-pixel electrode comprising a second main electrode and a second branch electrode connected to the second main electrode, wherein the second main electrode comprises a first split body arranged along the first direction, the second branch electrode forms a second acute angle with the first split body,
wherein in each of the pixel units, the first acute angle is greater than the second acute angle in at least one of the sub-pixels; and
wherein the second acute angles of the sub-pixels are different for different colors of the sub-pixels.

15. The display device according to claim 14, wherein, in each of the pixel units, the first acute angle is greater than the second acute angle by 5 to 15 degrees in at least one of the sub-pixels.

16. The display device according to claim 14, wherein, in each of the pixel units, the first acute angle is greater than the second acute angle by 0 to 5 degrees in at least one of the sub-pixels.

17. The display device according to claim 14, wherein the first acute angle is 40 to 45 degrees.

18. The display device according to claim 14, wherein the second acute angle is 30 to 45 degrees.

19. The display device according to claim 14, wherein each of the pixel units comprises a first sub-pixel, a second sub-pixel, and a third sub-pixel, and a color of the first sub-pixel, a color of the second sub-pixel, and a color of the third sub-pixel are different; and wherein the first acute angle of the first sub-pixel, the first acute angle of the second sub-pixel, and the first acute angle of the third sub-pixel are all 45 degrees, the second acute angle of the first sub-pixel and the second acute angle of the second sub-pixel are both 45 degrees or 40 degrees, and the second acute angle of the third sub-pixel is 40 degrees or 35 degrees.

20. The display device according to claim 14, wherein the pixel structure comprises pixel areas in one-to-one correspondence to the pixel units, each of the pixel areas comprises a plurality of sub-pixel areas, one of the sub-pixels is located in one of the sub-pixel areas;

wherein each of the sub-pixel areas comprises a main area and a sub-area, the main pixel electrode is located in the main area, and the sub-pixel electrode is located in the sub-area;

wherein the first main electrode further comprises a second portion arranged along a second direction, and the second main electrode further comprises a second split body arranged along a second direction; in each of the sub-pixels, the first main electrode divides the main area into four main domains, and the second main electrode divides the sub-area into four sub-domains; and wherein a plurality of first branch electrodes are distributed in each of the main domains, the plurality of first branch electrodes distributed in each of the main domains are arranged in parallel to each other at intervals, a plurality of second branch electrodes are distributed in each of the sub-domains, and the plurality of second branch electrodes distributed in each of the sub-domain are arranged in parallel to each other at intervals.

\* \* \* \* \*